United States Patent [19]

Earsley

[11] 4,446,085

[45] May 1, 1984

[54] MOLDING OF SEAL RINGS

[76] Inventor: Melvin L. Earsley, 616 E. Slaton Rd., Lubbock, Tex. 79404

[21] Appl. No.: 412,589

[22] Filed: Aug. 30, 1982

[51] Int. Cl.$^3$ .............................................. B29H 3/08
[52] U.S. Cl. ................... 264/108; 264/328.2; 264/328.3; 264/328.12; 264/328.18; 264/DIG. 53
[58] Field of Search ............... 264/108, 268, DIG. 6, 264/DIG. 53, 328.2, 328.3, 328.6, 328.12, 328.18; 425/DIG. 47

[56] References Cited

U.S. PATENT DOCUMENTS

| | | | |
|---|---|---|---|
| 2,538,198 | 1/1951 | Hosford . | |
| 3,549,735 | 12/1970 | Moss | 264/106 |
| 3,957,278 | 5/1976 | Rabe | 277/227 |
| 3,959,060 | 5/1976 | Jones | 264/328.12 |
| 4,203,732 | 5/1980 | Phaal | 264/108 |

FOREIGN PATENT DOCUMENTS

| | | | |
|---|---|---|---|
| 0047984 | 3/1982 | European Pat. Off. | 264/328.3 |
| 1067843 | 5/1967 | United Kingdom | 425/DIG. 47 |

*Primary Examiner*—James B. Lowe
*Attorney, Agent, or Firm*—Peter J. Murphy

[57] ABSTRACT

Seal rings are molded from an injection moldable elastomeric material, with the rings being designed to have an axially thick body, a rib at the outer periphery for mounting engagement within the outer race ring groove, and a flexible sealing lip at the inner periphery for engagement with the inner race ring. To provide a rigid support body for the ring, particles are dispersed within the moldable material to be injected into the molds, the filler particles having a minimum dimension substantially larger than the maximum dimension of the sealing lip so that, during molding, the filler particles are excluded from the lip but are embedded in the body portion to make that portion more rigid.

8 Claims, 4 Drawing Figures

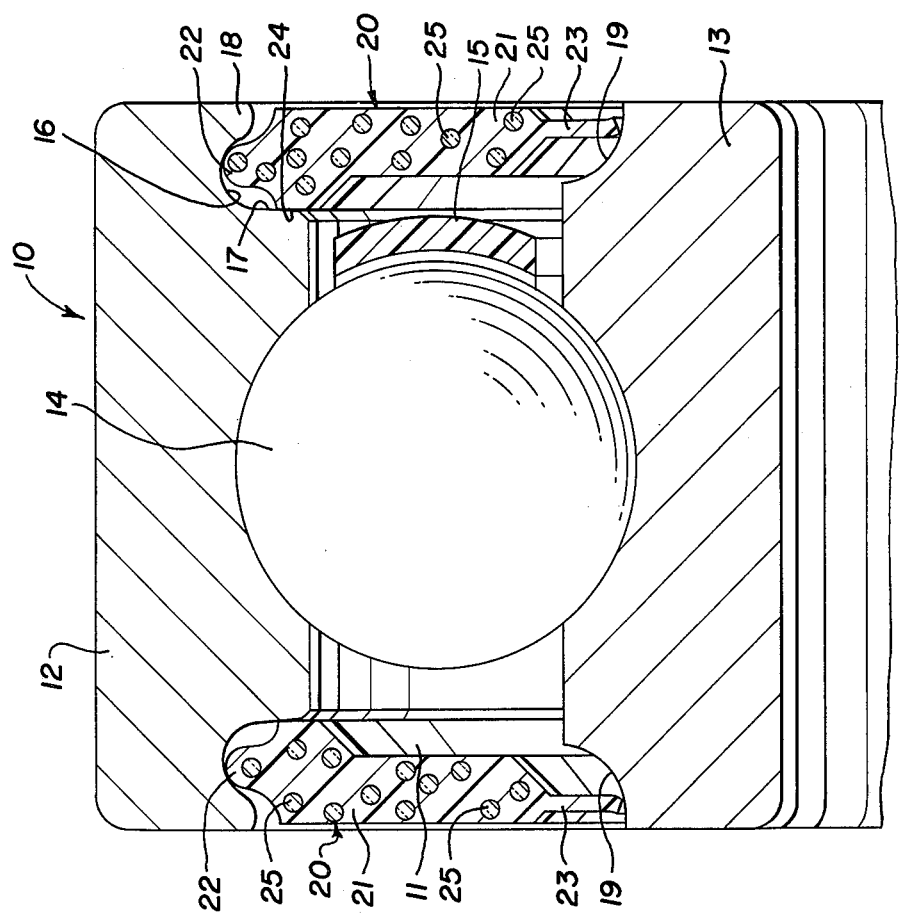

MOLDING OF SEAL RINGS

BACKGROUND AND SUMMARY OF THE INVENTION

This invention relates to grease seals for frictionless bearings, a term used generally to include ball bearings, roller bearings, needle bearings and the like. More particularly this invention relates to molded seals for use in such bearings, having dispersed and embedded stiffening particles within the seal body.

It is known that the useful life and satisfactory operation of frictionless bearings are largely dependent on efficient lubrication and safe protection against access of foreign bodies or moisture between the working surfaces.

It is known to provide seals for frictionless bearings for the purposes of retaining grease and excluding contaminants, which seals are fabricated from metal disks. Such seals are reasonable effective, and have the advantage that expansion due to heat does not present a problem because the disk metal has essentially the same rate of expansion as the ring metal. A disadvantage of metal seals is the cost of assembly in that the seals are fitted into the ring grooves by a stamping or rolling operation wherein the flange of the seal is formed into the retainer seal groove, usually in the outer ring, whereby the seal is retained in the bearing. Another disadvantage of the use of metal disk seals is that these metal disks are relatively thick and rigid, and if the metal disk and the outer ring groove are not perfectly concentric, the forcing of the disk into the groove may produce an out-of-round condition in the outer ring resulting in binding of the assembled bearing.

Another known form of bearing seal is a conglomerate structure wherein a seal body of molded rubber or the like is molded around a metal stiffener such as a metal washer. This assembly provides a relatively rigid body to hold the seal in place within the groove of the outer ring, for example, and the outer periphery of the seal is sufficiently resilient to allow the seal to be snapped into the groove and to hold the seal within the bearing. The resiliency of the rubber will also accommodate expansion of the seal relative to the outer race. The fabrication of rubber rings with metal inserts is obviously expensive. An alternative configuration is to bond a metal stiffener such as a washer to a molded rubber seal, and this is also expensive since it requires a separate bonding operation.

From the standpoint of economic manufacture, it is desirable to produce a seal which can be fabricated from a moldable material such as a rubberlike material, provided that such a seal can be fabricated to have the desired characteristics, one being that the support body portion of the seal would have sufficient rigidity to enable the seal to retain itself within the groove of one bearing ring, and another being that the seal provides a flexible sealing lip or flange for sealing engagement with the other bearing ring.

It is known to provide seals made of an injection moldable material having particles embedded in a portion thereof to make a support portion, for example, more rigid than a sealing lip portion; and examples of such seals in a shaft seal configuration are disclosed in Hosford U.S. Pat. No. 2,538,198 and Rabe U.S. Pat. No. 3,957,278. The fabrication processes disclosed in both of these patents includes some special steps in addition to simple injection molding which increases the cost of bearing seals of this type.

A principal object of this invention is to provide an improved inexpensive and easily constructed bearing seal for retaining lubricant within a bearing and for excluding dirt therefrom.

Another object of this invention is to provide an improved bearing seal fabricated from a moldable material having dispersed and embedded particles for improving the stiffness of the seal body and enable that body to retain itself in sealing relation in the bearing assembly.

A further object of this invention is to provide an improved bearing seal fabricated from a moldable material having dispersed and embedded particles to reduce the expansion of the seal body resulting from heat buildup.

Still another object of this invention is to provide an improved bearing seal of a moldable material, having a rigid body to enable retention of the seal within one race of a bearing assembly, and having a flexible sealing flange for effective sealing relation with the other race of the bearing assembly.

Another object of this invention is to provide an improved bearing seal which is capable of economic fabrication, and which provides for economic assembly of the bearing seal in a bearing assembly.

These objects are accomplished in a seal ring for a frictionless bearing which is fabricated from an injection moldable material. The seal ring has an axially thick body, means on that body configured to be received in an annular seal groove of one of the bearing rings, and an axially thin peripheral sealing lip on the body for sealing engagement with the sealing surface of the other bearing ring. The moldable material has a plurality of dispersed particles which have a minimum transferse dimension greater than the axial thickness of the sealing lip. The body of the cured ring includes embedded filler particles to stiffen the body, and the sealing lip contains no such particles and is therefore more flexible. The objects are also accomplished in that seal ring in a bearing assembly which includes inner and outer rings, and a plurality of rolling bearings disposed between confronting faces of the ring. One of those confronting faces has a groove around at least one end thereof facing the other ring, to receive and retain the seal ring; and the other bearing ring has a seal surface confronting the groove to be engaged by the sealing lip of the seal ring. These objects are also accomplished in a method for fabricating a bearing seal for a frictionless bearing having a relatively rigid support body and a relatively flexible sealing lip. The method includes the steps: (1) designing said seal ring to have a relatively thick body and a relatively thin sealing lip the lip having a maximum selected thickness, and designing a mold for the seal ring; (2) forming the seal ring from an injection moldable material containing dispersed stiffening particles having a specified minimum transverse dimension which is significantly greater than the thickness of the sealing lip; and (3) effecting the setting of the moldable material to produce a molded body having embedded stiffening particles and an integral sealing lip free of said embedded stiffening particles.

The novel features and the advantages of the invention, as well as additional objects thereof, will be understood more fully from the following description when read in connection with the accompanying drawing.

DRAWING

FIG. 1 is a radial sectional view of a bearing assembly incorporating a seal according to the invention;

FIG. 2 is a diametral sectional view of a seal according to the invention;

DESCRIPTION OF THE PREFERRED EMBODIMENT

Figure 4:
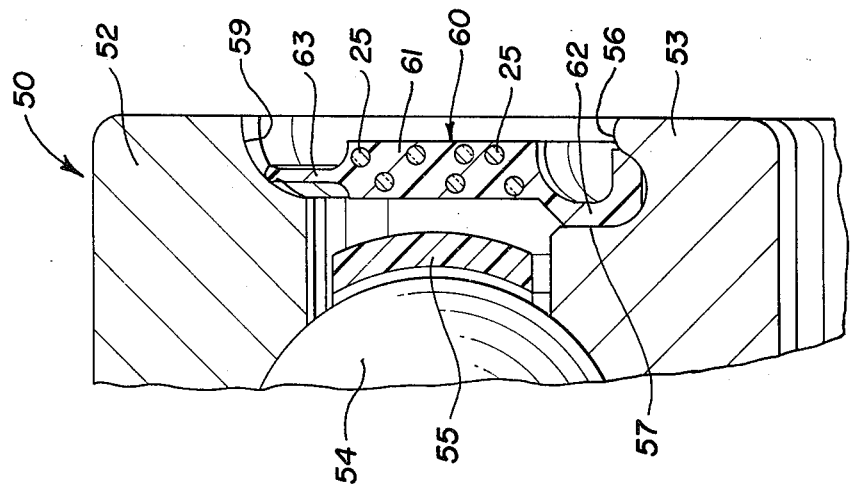
FIG. 4 is a fragmentary sectional view of a modified bearing assembly.

This invention is concerned with the fabrication of grease and dust seals for frictionless bearings, which seals may be fabricated from injection moldable material, preferably an elastomeric material having elastic properties, to enable economic production of such seals. The invention is further concerned with such injection moldable seal wherein a body portion of the seal has embedded particles to stiffen that portion of the seal to enable it to retain itself in the desired sealing relation within the bearing assembly, and wherein the seal includes a peripheral, relatively flexible sealing lip or flange which does not include stiffening particles and therefore has greater elasticity for effective sealing with the inner bearing ring for example. The seal includes a peripheral locking lip for retaining the seal in a seal groove of a bearing ring; and this locking lip may also be devoid of stiffening particles for greater flexibility.

FIG. 1 of the drawing is a radial sectional view of a frictionless ball bearing assembly 10 having seals 20 which close the two ends of an annular lubricant chamber 11 between a pair of relatively rotatable outer and inner rings 12 and 13, and which rings include confronting raceways which guide the rolling bearing balls 14. Typically the bearing balls are spaced circumferentially by a ball separator 15.

Both ends of the outer bearing ring 12 are provided with an annular, inward facing seal groove 16 that curves transversely between an annular generally radially disposed shoulder 17 and a transversely rounded annular land 18. The land 18 has a diameter which is intermediate that of the bottom of the groove 16 and that of the cylindrical inner wall of the outer bearing ring.

Both ends of the inner bearing ring are formed with an annular, concave seal surface 19 confronting the grooves 16, each seal surface having the transverse configuration of a concave curve extending between the outer wall and an end wall of the inner ring.

The seal 20 is preferably composed of a material which may be formed in a simple injection molding operation under the influence of heat and pressure. The seal may be composed of various plastic materials which are generally referred to as elastomers or elastomeric, and preferably an elastic material that has good heat resistant properties since the seal would be subject to significant increase in temperature in operation. A polyester elastomer is one example of suitable material for this purpose.

The seal 20 may have any desired cross sectional configuration, and the configuration illustrated in the drawings is merely by way of example. The cross sectional configuration of the seal includes three basic portions, namely: a relatively massive body 21, a peripheral annular locking lip 22, shown in the drawings at the outer periphery of the seal for coaction with a seal groove 16, and a peripheral, flexible and elastic sealing lip 23, shown in the drawings at the inner periphery of the seal for sealing engagement with a seal surface 19 of the inner bearing ring 13.

Frequently, in bearing assemblies of this type, the grease and dust seal is locked in a seal groove provided in the outer bearing ring with the seal having a sealing lip for rotational coaction with a seal surface of the inner bearing ring. However, in some bearing designs, the seal may be locked in a seal groove provided in the inner bearing ring, with the sealing lip coacting with a seal surface of the outer bearing ring. The seal body 21 provides an inner peripheral face to bear on the outer ring shoulder 17 to locate the seal axially relative to the remainder of the bearing assembly. The seal configuration is such that the locking lip 22 is sufficiently resilient to allow the seal to be snapped into the seal groove 16 and to be self-retaining therein and also to provide a seal with the seal groove, with the seal body being sufficiently rigid to maintain the sealing lip 23 in the desired sealing relation with the inner ring seal surface 19; and the sealing lip 23 is desirably elastic and flexible to maintain good sealing relation with the inner ring and to minimize frictional heat buildup due to the relative rotation of these members.

Those characteristics of the elastomeric material are accomplished by providing a sealing lip which has a fixed maximum axial thickness, and by mixing into the elastomeric material to be injected into the mold filler particles 25 having a minimum diametral dimension which is significantly greater than the maximum axial thickness of the sealing lip. The stiffening particles 25 are suitably dispersed in the moldable material so that, when the material is injected into the mold, the particles will be embedded in the seal body 21 and locking lip 22, but will be prevented from forming a part of the sealing lip 23 because of the above mentioned relative dimensions. The resulting cured seal then provides the sealing lip 23 with the desired properties of flexibility and elasticity, and also produces a body 21 with the desired stiffness to accomplish its function. The fabrication of these seals is accomplished employing well known injection molding techniques, without significant modification, to enable economic production of these seals having the desired properties.

The filler particles 25 may be fabricated from any suitable material which has the necessary resistance to heat generated in the bearing seal. Glass beads, sometimes referred to as glass spheres, are a preferred form of filler particle; and other suitable materials may be mineral reinforcers and steel balls. An ancillary advantage of a seal having embedded filler particles is that the seal will not expand as much due to operational heat. It is known that seals fabricated from elastomeric materials, have a high coefficient of thermal expansion relative to that of the bearing ring material; and the relative expansion sometimes causes the seal to buckle and separate the sealing lip from its coacting seal surface, with resultant loss of grease or introduction of contaminants. A seal with embedded particles will likely have a lower coefficient of thermal expansion so that this problem is obviated.

Figure 3:
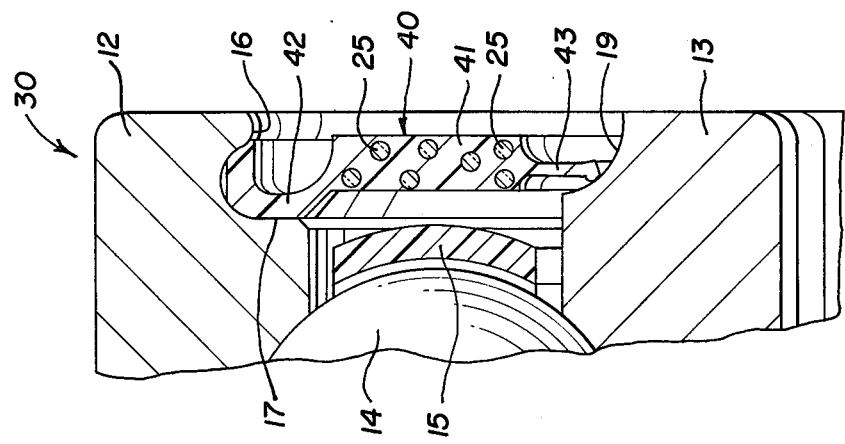
FIG. 3 is a fragmentary sectional view of a bearing assembly incorporating a modified form of seal.

FIG. 3 of the drawing is a fragmentary sectional view of a ball bearing assembly 30 which is identical to the assembly 10 of FIG. 1 but includes a modified form of seal 40. The bearing assembly includes an outer ring 12 having a seal groove 16, an inner ring 13 having a seal surface 19, bearing balls 14 and a ball separator 15.

The seal 40 is generally similar to the seal 20, including a relatively thick body 41, a peripheral locking lip 42 at the outer periphery of the body, and a peripheral sealing lip 43 at the inner periphery of the body. The body is formed with embedded stiffening particles 25 of the type described for the seal 20. The sealing lip 43, similar to the sealing lip 23, has a maximum axial thickness less than the minimum diametral dimension of the stiffening particles so that those particles cannot pass into the sealing lip during the molding process.

The locking lip 42 is C-shaped in cross section and also has a relatively thin section, particularly a relatively thin neck or wall section immediately adjacent to the body 41, which also has a maximum thickness less than the minimum diametral dimension of the stiffening particles 25 so that those particles cannot pass into the locking lip. During the molding process, of course, the elastomeric material with dispersed stiffening particles would be injected into the mold cavity to form the seal body 41.

In this seal configuration 40, then, the body 41 is stiffened by the embeddment of the stiffening particles, and both the sealing lip 43 and locking lip 42 are devoid of stiffening particles to provide the desired flexibility and elasticity. The locking lip 42 coacts with the seal groove 16 and adjacent shoulder 17 of the outer ring to locate the seal in the bearing assembly, and to maintain the sealing lip 43 in desired sealing relation with the seal surface 19.

FIG. 4 of the drawing is a fragmentary sectional view of a modified form of bearing assembly 50, generally similar to those previously described. In this bearing assembly, the inner ring 53 is provided with a seal groove 56 into which the seal is locked. The seal then is rotationally locked to the inner ring rather than the outer ring; and the outer ring 52 is provided with a seal surface 59, similar to the seal surface 19 previously described but provided of course on the inner wall of the outer ring. This bearing assembly includes the bearing balls 54 and a ball separator 55 similar to those previously described.

A seal 60 is similar to the seal 40 previously described, except that a peripheral locking lip 62 is formed on the inner periphery of the seal and the peripheral seal lip 63 is provided on the outer periphery of the seal. The locking lip coacts with the seal groove 56 and associated shoulder 57 of the inner ring to locate the seal within the assembly, and to maintain the sealing lip 63 in sealing relation with the seal surface 59. The seal body 61 includes embedded stiffening particles 25 of the type previously described; and because of the relative size dimensions of these embedded particles and the locking lip and sealing lip, the locking lip and sealing lip of the seal 60 are again devoid of stiffening particles to provide the desired flexibility and elasticity of these lips.

A method for fabricating a bearing seal as described above includes one or more of the following steps. A seal is designed having a body which is relatively thick axially and having an integral peripheral sealing lip which is relatively thin axially. The sealing lip is designed to a specified maximum thickness. A mold is designed with one or more suitable mold cavities for an injection molding process. The bearing seal is formed from an injection moldable material having filler or stiffening particles therein designed to a minimum specified transverse dimension, which dimension is significantly greater than the thickness of the sealing lip. The moldable material is mixed with the dispersed particles and introduced into the seal body portion of the mold cavity, and the setting of the material is effected to produce a ring seal included a molded body having embedded stiffening particles to rigidify the body and including an integral sealing lip which does not contain any of those embedded stiffening particles and is therefore quite flexible.

Alternatively the seal may be designed to have both a sealing lip and a locking lip which are relatively thin axially, with the sealing lip having at least a neck portion immediately adjacent to the body which is designed to a specified maximum thickness to prevent passage of the stiffening particles. The resultant molded seal then includes both a sealing lip and a locking lip which are devoid of stiffening particles for greater flexibility and elasticity.

What has been described is a unique seal for frictionless bearings, and a method for producing same, which seal is fabricated principally from an elastic elastomeric material using convention injection molding techniques, and which has a relatively rigid support body and a relatively flexible and elastic sealing lip, the support body having sufficient rigidity to maintain the sealing lip in sealing relation with its associated bearing ring.

A principal feature of the invention is that the bearing seal may be produced using convention injection molding techniques and is therefore economical to produce. An ancillary feature of the invention is that the support body of the bearing includes filler particles to rigidify the body portion of the ring to enhance its supporting function, and yet the seal ring includes a very flexible integral sealing lip for efficient sealing with its associated bearing ring.

While the preferred embodiment of the invention has been illustrated and described, it will be understood by those skilled in the art that changes and modifications may be resorted to without departing from the spirit and scope of the invention.

What is claimed is:

1. A method for fabricating a bearing seal for a frictionless bearing including the steps
   designing a seal ring to have an axially thick body and to have an axially thin integral sealing lip;
   designing a mold for said ring seal having at least one mold cavity for injection molding thereof;
   forming said seal from an injection moldable material having dispersed particles therein with a minimum transverse dimension, which dimension is greater than the minimum thickness of said sealing lip;
   introducing said injection moldable material with dispersed particles into the body portion of said mold cavity;
   and effecting the setting of said moldable material to produce a ring with a molded body having embedded stiffening particles therein and with an integral sealing lip devoid of any of said stiffening particles.

2. A method as set forth in claim 1 including
   forming said seal from an elastic elastomeric material.

3. A method as set forth in claim 1 including
   forming said moldable material with dispersed glass beads therein.

4. A method as set forth in claim 1 including
   forming said seal from an elastomeric material.

5. A method as set forth in claim 1
   designing said seal ring to have an integral locking lip with a thin wall section adjacent to said body; and
   forming said seal from said injection moldable material having dispersed particles therein, wherein the minimum transverse dimension of said particles is greater than the thickness of said locking lip thin wall section.

6. A method as set forth in claim 1 including
designing said seal ring to have an axially thin integral locking lip;
and providing said injection moldable material having dispersed particles therein with a minimum transverse dimension, which dimension is greater than the minimum thickness of said locking lip.

7. A method as set forth in claim 1 including
designing said seal ring to have an integral sealing lip with a uniform axial thickness;
and providing said injection moldable material with dispersed particles therein having a minimum transverse dimension which is greater than the thickness of said sealing lip.

8. A method as set forth in claim 1
designing said seal ring to have an integral sealing lip with a thin wall section adjacent to said body; and forming said seal from said injection moldable material having dispersed particles therein, wherein the minimum transverse dimension of said particles is greater than the thickness of said sealing lip thin wall section.

* * * * *